United States Patent [19]

Blum

[11] 3,908,878

[45] Sept. 30, 1975

[54] APPARATUS FOR PRODUCING GLASS KNIVES FOR MICROTOMES AND THE LIKE

[75] Inventor: Josef Blum, Norwalk, Conn.

[73] Assignee: E. I. Du Pont de Nemours and Company, Wilmington, Del.

[22] Filed: Nov. 8, 1973

[21] Appl. No.: 413,960

[52] U.S. Cl............................. 225/96.5; 225/103
[51] Int. Cl............................................. B26f 3/00
[58] Field of Search ................ 225/2, 96, 96.5, 103

[56] References Cited
UNITED STATES PATENTS

| | | | |
|---|---|---|---|
| 1,117,736 | 11/1914 | Whittemore | 225/96.5 |
| 3,207,398 | 9/1965 | Forsstrom et al. | 225/96 |
| 3,494,521 | 2/1970 | Hellstrom | 225/96.5 |
| 3,570,734 | 3/1971 | Allen | 225/96.5 X |
| 3,790,052 | 2/1974 | Toll | 225/96.5 X |

*Primary Examiner*—J. M. Meister
*Assistant Examiner*—Leon Gilden

[57] ABSTRACT

Apparatus for scoring and breaking glass blocks to produce microtome knives, or the like, wherein spaced parallel linear forces are applied on opposite flat sides of the blocks to produce the glass breaking action. Means are provided for accommodating the apparatus selectively for scoring and breaking the glass blocks perpendicularly and diagonally. Mechanisms are also provided for determining the length of the score mark to be produced upon the glass block by the glass cutting wheel in the apparatus. Torsion bar means are further included for yieldably and retractably applying the cutting wheel with controlled force to the glass block for scoring the latter prior to the breaking operation.

18 Claims, 25 Drawing Figures

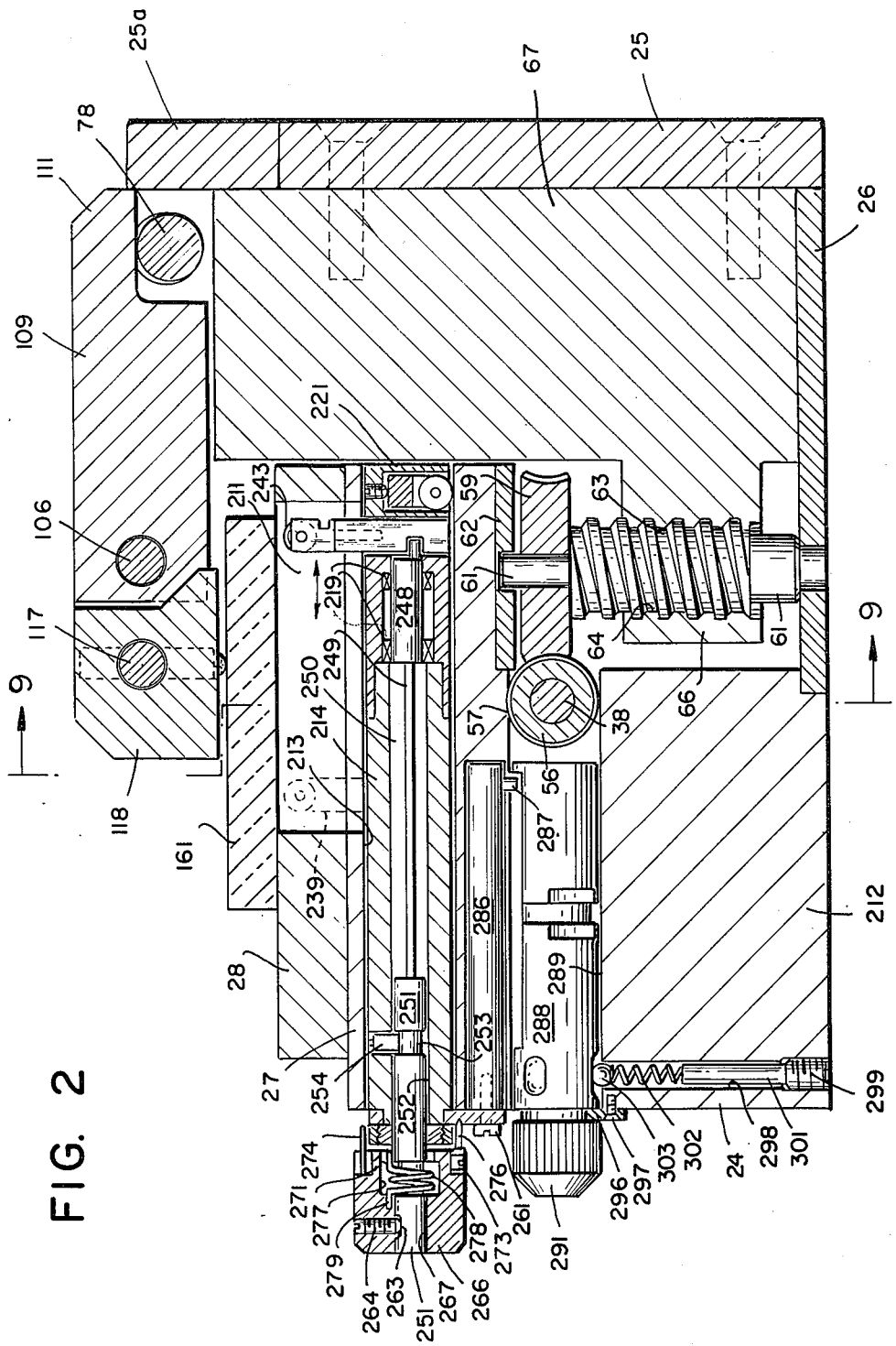

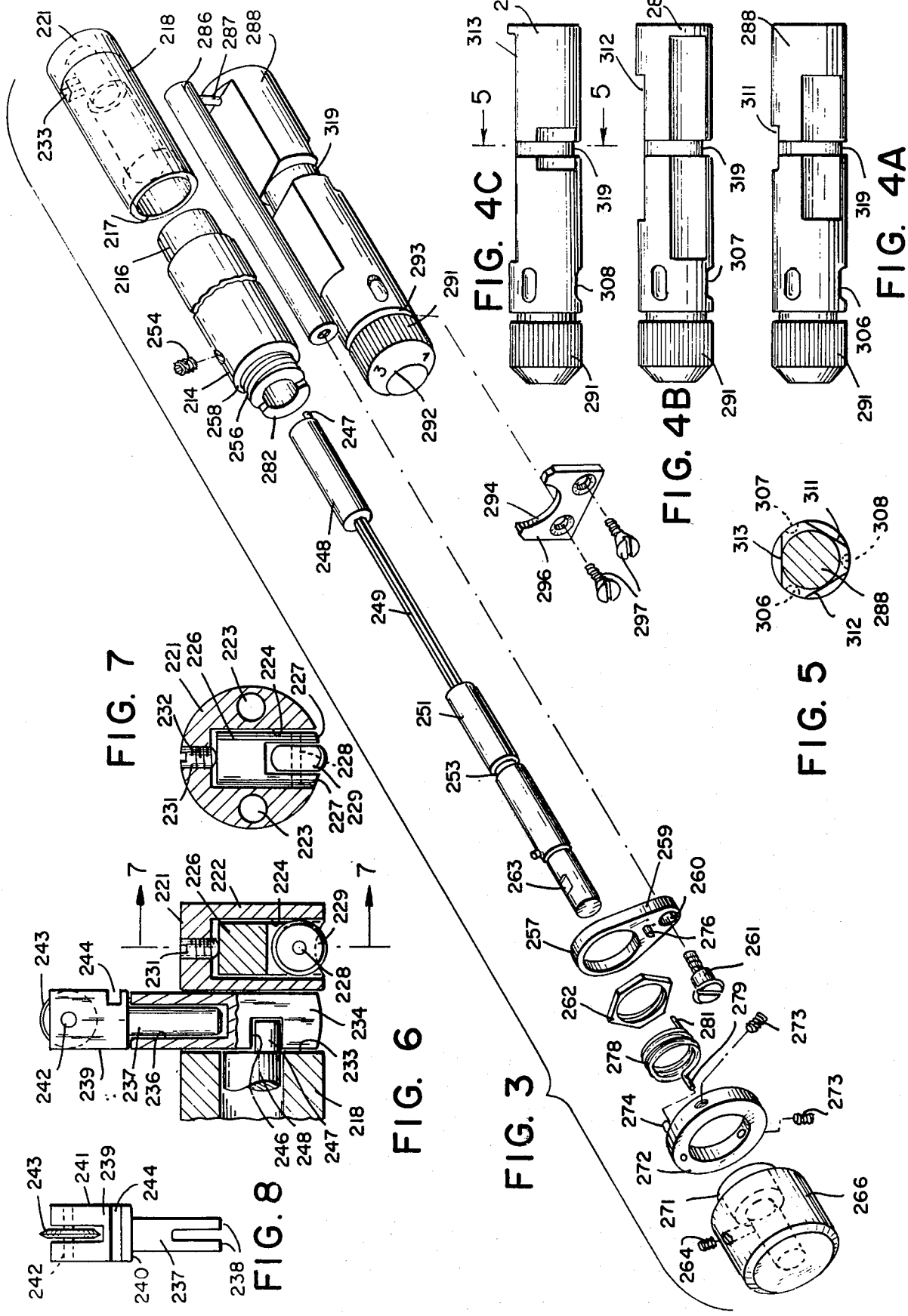

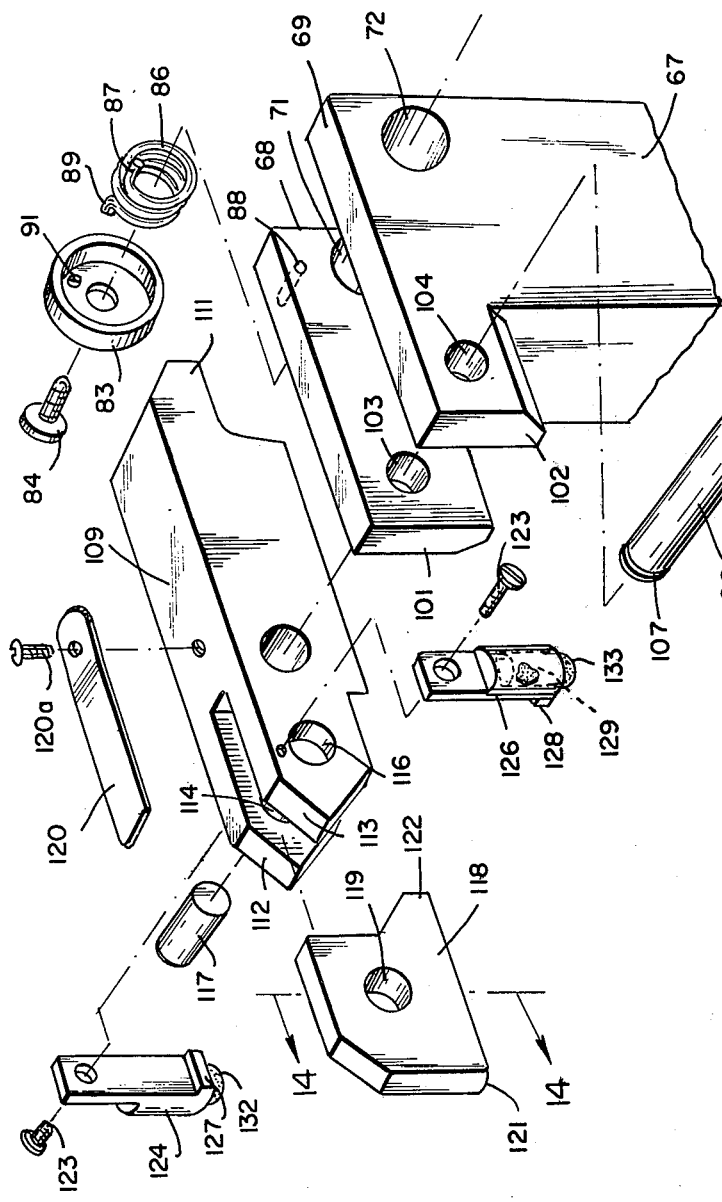

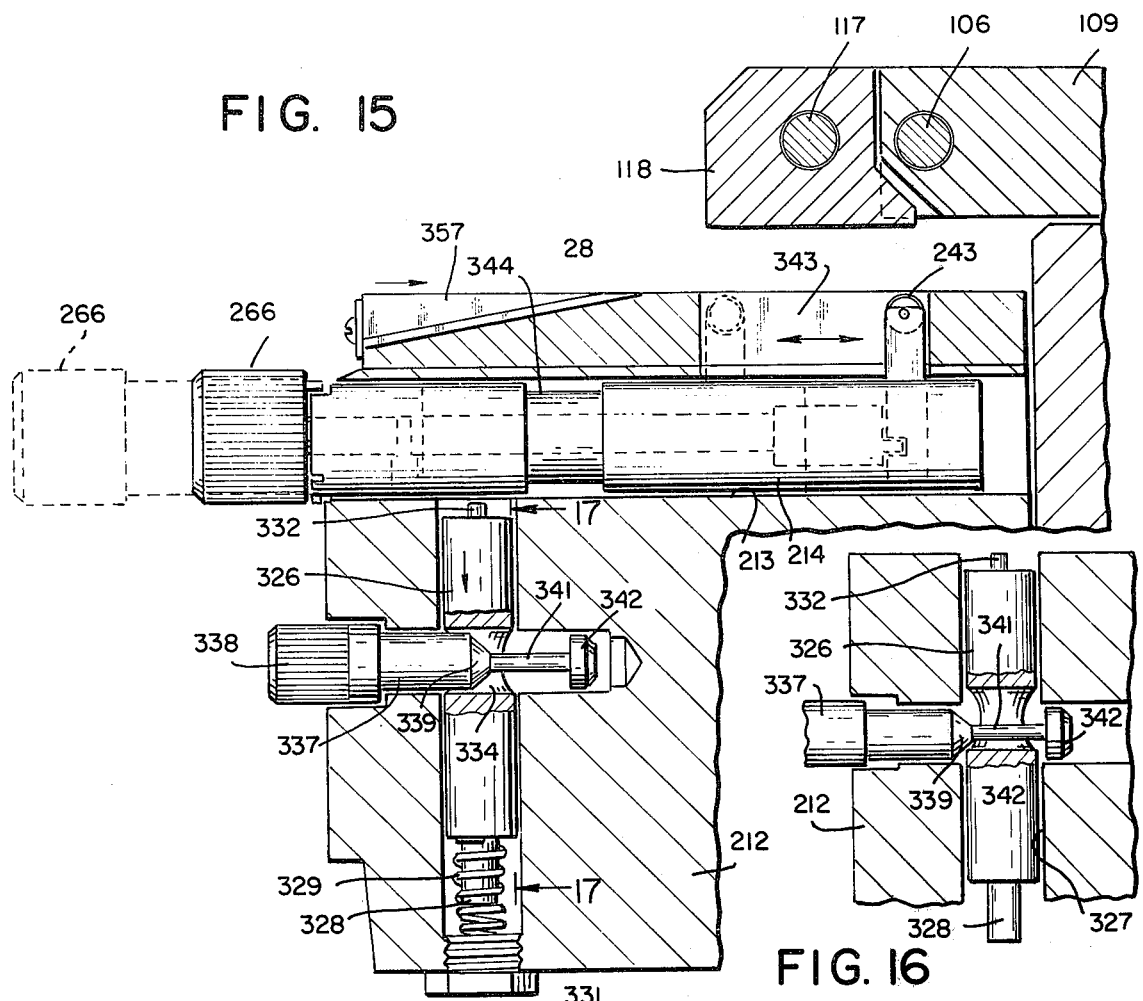
FIG. 15
FIG. 16
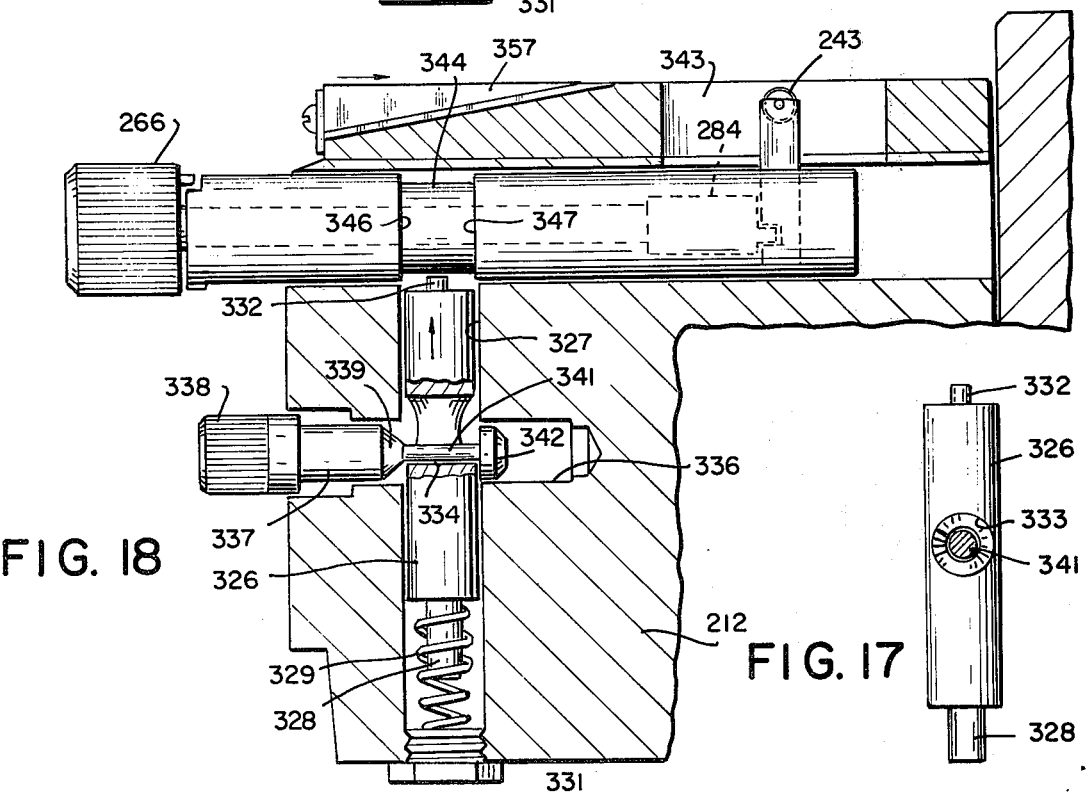
FIG. 18
FIG. 17

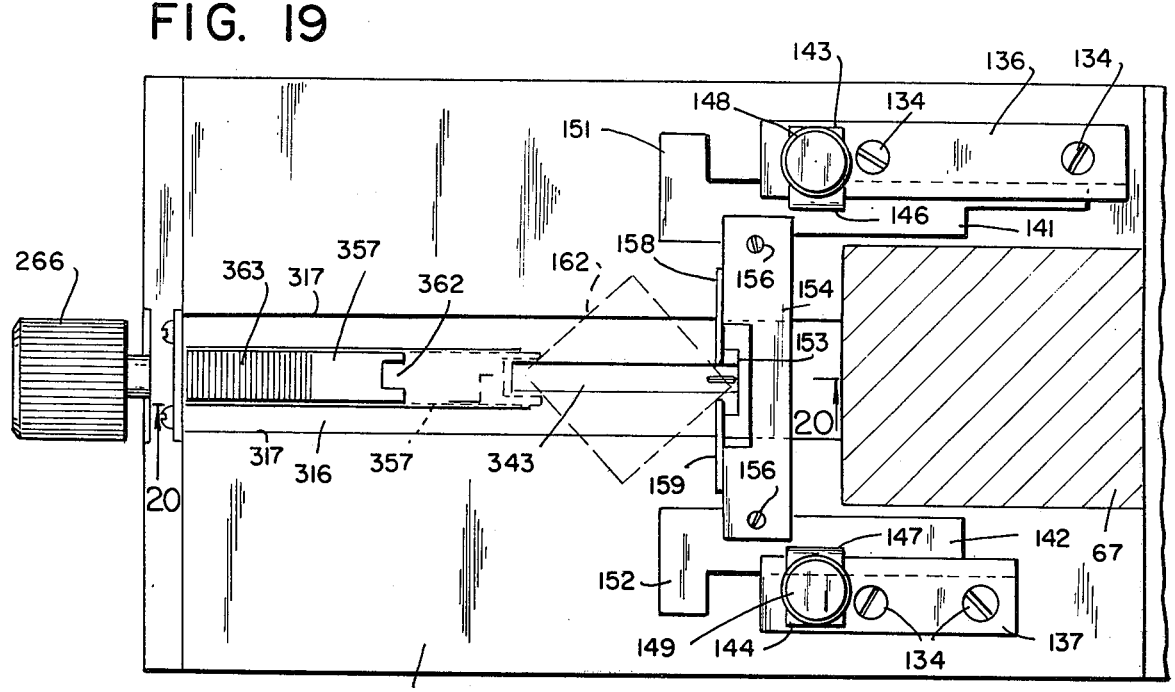
FIG. 19
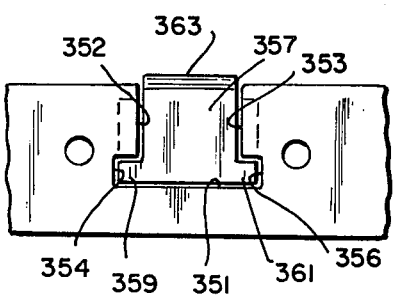
FIG. 21
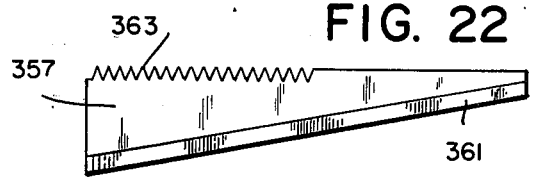
FIG. 20
FIG. 22
FIG. 23

APPARATUS FOR PRODUCING GLASS KNIVES FOR MICROTOMES AND THE LIKE

BACKGROUND OF THE INVENTION

1. Field of the Invention:

The present invention relates to the production of glass knives for microtomes and the like, and more particularly to an apparatus and system for breaking the glass blocks in a manner as to ensure a straight line break after the block has been scored by the cutting wheel.

The improved apparatus provides means for applying spaced parallel linear forces upon the glass block whereby the latter is subjected to breaking stresses that will induce a true linear break in the glass.

2. Description of the Prior Art:

According to the prior art, the means for breaking glass blocks comprises a pair of spaced, pointed, or rounded supports upon which the glass block rests, with a corresponding pair of knobs or supports aligned with the other supports and providing stabilizing pressure on top of the glass block. After the glass block is scored on the one surface thereof, a rounded pressure knob is brought down with sufficient force on the opposite surface of the glass block directly above the score mark in order to produce the break in the glass block. Such prior art is exemplified in U.S. Pat. No. 3,207,398. Other prior art of which the applicant is aware constitute U.S. Pat. No. 1.117,736, 2,924,044, 3,494,521 and 3,494,523.

The disadvantages of the prior art systems reside in the fact that the breaking forces are applied to the glass block in discrete point or spot areas whereby inadequate control over the propagation of the break is maintained. Thus, the propagated break does not follow a true linear path and results in a large proportion of defective cut blocks and cut knives which must be discarded as waste.

SUMMARY OF THE INVENTION

According to the present invention, the foregoing disadvantages are obviated by providing for the application of breaking forces in parallel elongated linear arry. This arrangement takes the form of placing the glass block upon a flat surface over a recessed channel, the elongated parallel linear edges of said channel providing fulcrum lines upon and between which the glass block is stressed for breaking. After the bottom of the glass block is scored with a cut parallel to and intermediate the linear channel edges, a linear force is applied on the top surface of the glass block directly above the score mark and parallel to the channel edges, to produce the breaking of the glass block. The top linear force is applied by means of an elongated bar which pivotably accommodates itself to the top surface of the glass block so that an even and consistent pressure force is brought to bear upon the glass block and distributed along an elongated path. By applying linearly arrayed breaking forces to the glass block, a far higher degree of success is achieved in producing satisfactory breaks on the glass block than has hitherto been achieved by prior art devices so that very few rejects are encountered.

These and other novel features and advantages of the present invention will be described and defined in the following specification and claims.

BRIEF DESCRIPTION OF THE DRAWINGS

FIG. 2 is a vertical section view taken on line 2—2 of FIG. 1, some parts being in elevation and some parts being omitted;

FIG. 3 is an exploded view of the glass cutting wheel operating an adjustment assembly, some parts being omitted;

FIGS. 4A, 4B and 4C, are side elevations of several positions assumed by one of the components illustrated in FIG. 3 for determining the length of the stroke of the glass cutting wheel;

FIG. 5 is a section view taken on line 5—5 of FIG. 4C;

FIG. 6 is a greatly enlarged fragmentary section view of the cutting wheel assembly and mounting arrangement;

FIG. 7 is a section view taken on line 7—7 of FIG. 6;

FIG. 8 is a front view of the glass cutting wheel and its support element shown in a side view in FIG. 6;

FIG. 13 is an exploded perspective view of the clamp mechanism shown in FIGS. 1, 2 and 9;

FIG. 14 is a section view taken on line 14-14 of one of the components shown in FIG. 13;

FIG. 15 is a fragmentary view showing alternative embodiments of the invention herein, said view being comparable to a portion of the apparatus shown in FIG. 2, some parts being shown in section, some parts in elevation, and some parts in dotted outline, illustrating the mechanisms for alternatively producing the long and short scoring strokes of the glass cutting wheel with the apparatus shown in condition for producing the long stroke;

FIG. 16 is a fragmentary portion of FIG. 15 showing the mechanism for producing the short stroke condition being partially retracted;

FIG. 17 is a view taken on line 17—17 of FIG. 15;

FIG. 18 is a fragmentary view similar to FIG. 15 showing the apparatus arranged for producing the short stroke of the cutting wheel;

FIG. 19 is a top view of the apparatus showing an alternative mechanism for positioning the glass block in the diagonal position with the positioning element in the retracted position;

FIG. 20 is a fragmentary view taken on line 20—20 of FIG. 19 with the glass positioning element shown in elevation in the retracted position in solid line, and in the glass holding position in dotted outline;

FIG. 21 is an enlarged view taken on line 21—21 of FIG. 20;

FIG. 22 is an enlarged side view of the slide element shown in FIGS. 19 and 20; and FIG. 23 is a top view of the slide element shown in FIG. 22.

DESCRIPTION OF THE PREFERRED EMBODIMENTS

Figure 1:
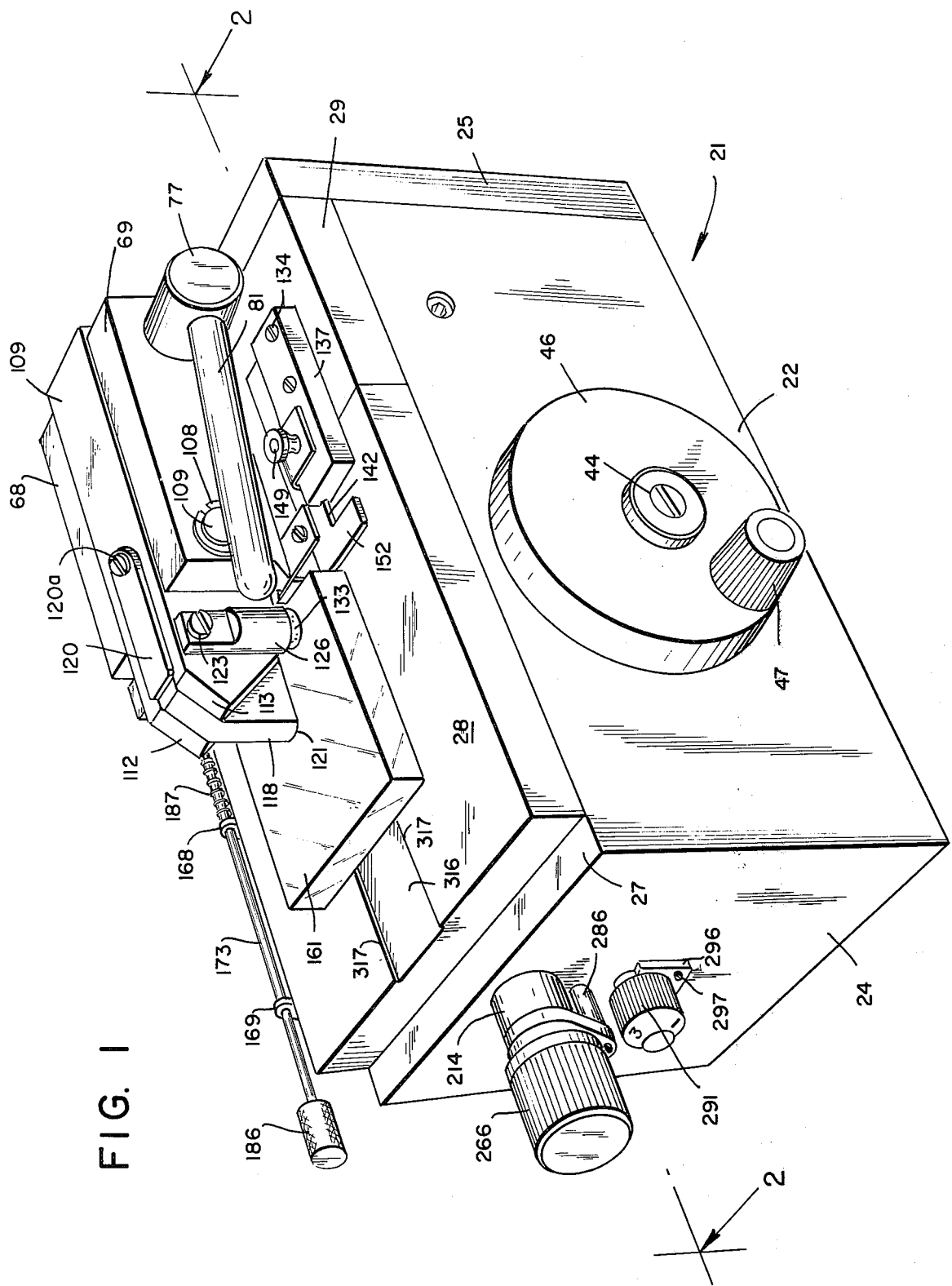
FIG. 1 is a perspective view of the apparatus of the present invention, some parts being omitted.
Figure 9:
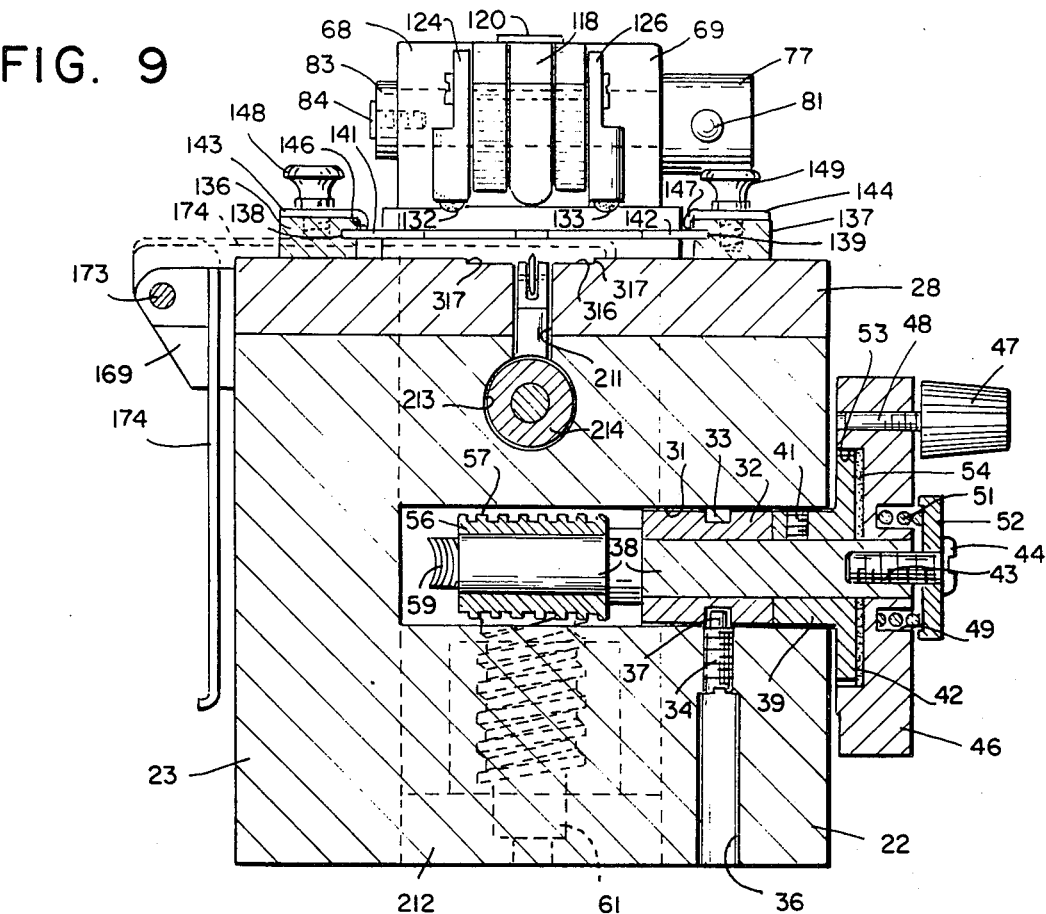
FIG. 9 is a section view taken on line 9—9 of FIG. 2, some parts being omitted, some parts being shown in dotted outline, and other parts in elevation.

Referring now to the drawings, and particularly FIGS. 1, 2 and 9, the glass knife cutting apparatus of the present invention comprises a box-like housing, generally designated 21, made of steel, aluminum, or the like, and comprising a pair of vertical, parallel spaced side walls 22 and 23, a front wall 24 and a back plate 25. Integrally formed on the top center portion of plate 25 is an upwardly extending projection 25a.

Housing 21 is provided with a horizontal floor plate 26 and a horizontal cover plate 27, the latter extending from the front wall 24 partially rearwardly toward back plate 25 and extending laterally between vertical side walls 22 and 23.

Secured on top of cover plate 27 is a horizontal sstage or platform 23 which extends to the repective outer surfaces of side walls 22 and 23, and partially rearwardly toward back plate 25. Mounted upon and between side walls 22 and 23, and located between platform 28 and back plate 25, is a second stage or platform 29, the two platforms 28 and 29 abutting each other and forming a general top enclosure for housing 21.

The foregoing components are secured to one another by suitable means such as bolts, or the like.

Extending through a horizontal aperture 31 in wall 22 intermediate the top and bottom thereof, is an annular bearing 32 provided intermediate its ends with an annular recess 33. Bearing 32 is releasably secured against longitudinal movement in aperture 31 by means of a set screw 34 threadably mounted at the upper end of a vertical recess 36 in wall 22. The upwardly projecting stub 37 of set screw 34 extends into annular recess 33 to prevent lateral movement of bearing 32 during operation of the apparatus. The retraction of set screw 34 and the concomitant retraction of stub 37 permits the disassembly of the bearing 32 from the apparatus.

Rotatably positioned longitudinally within bearing 32 is a drive shaft 38 to a portion of which is circumferentially connected an annular hub 39 by means of set screw 41. Both shaft 38 and hub 39 extend outwardly and externally of wall 22, said hub terminating in an integrally formed, radially extending circular clutch plate 42 which rotates with shaft 38.

The outer end portion of shaft 38 extends beyond clutch plate 42 and has a longitudinal threaded recess 43 engaged by screw 44. Rotatably positioned around the outer end of shaft 38 is a circular hand wheel 46 having an outwardly extending fluted or knurled knob 47 rotatably mounted on a pin 48 located near the periphery of said wheel 46 whereby the latter may be rotated by the operator grasping said knob. The outer surface of wheel 46 has an annular recess 49 which accommodates a coiled spring 51 held captive within said recess by means of a circular retainer plate 52 secured against the outer portion of said spring by means of the head of screw 44.

The inner surface of wheel 46 has a circular recess 53, in the inner vertical end of which is nested a circular friction clutch ring 54 which bears against and cooperates frictionally with the outer surface of clutch plate 42.

The action of spring 51 normally urges wheel 46 inwardly and causes clutch ring 54 to bear against the outer vertical surface of clutch plate 42 whereby upon rotation of wheel 46, the frictional engagement between ring 54 and clutch plate 42 causes the rotation of shaft 38. When resistance to the rotation of shaft 38 occurs by the apparatus functions described hereinafter, said shaft will remain motionless, notwithstanding the continued rotation of wheel 46 whereby slippage occurs between clutch plate 42 and clutch ring 54.

Mounted fast on the inner end of shaft 38 and rotating therewith is a sleeve 56 whose peripheral surface is formed in a helical worm 57. Worm 57 cooperates with the periphery of worm gear 59 mounted on a vertical rotatable shaft 61, the upper end of which rotates in a suitable bearing within horizontal plate 62 supported between walls 22 and 23. The lower end of shaft 61 rotates within a suitable bearing within floor plate 26. Integrally formed intermediate the ends of shaft 61 and rotating therewith is a screw 63 which engages a threaded aperture 64 in a horizontally extending stub 66 of vertically extending sliding clamp arm 67. See also FIG. 13. Upon rotation of hand wheel 46, gear 59 is rotated by worm 57 to cause rotation of shaft 61 and screw 63 whereby upward and downward morements within limits are selectively imparted to clamp arm 67.

Clamp arm 67 is made of a heavy, rigid bar of steel, or the like, having at its upper end a pair of integrally formed, upwardly extending, spaced apart supports 68 and 69. See FIGS. 1, 2 and 13. The rear portions of supports 68 and 69 have axially aligned apertures 71 and 72 which rotatably accommodate the spaced circular stub portions 73 and 74 of an eccentric cam shaft 76, the right end of which terminates in a head 77 which is located externally of support 69. The intermediate portion of shaft 76 is located between the respective opposing inner surfaces of support 68 and 69 and has an eccentric cross section in order to function as an eccentric cam 78, as will be described hereinafter. Head 77 has a laterally extending recess 79 which accommodates one end of a cam handle 81 secured therein by means of a set screw 82, or the like.

Located on the outer surface of support 68 is a circular spring retainer cap 83 maintained against said wall by means of screw 84, the inner end of which engages a suitably threaded aperture 85 in the outer end of stub portion 73. Located within cap 83 is a helical return spring 86, one tang 87 of which extends into and is retained within an accommodating aperture 88 in suport 68, while tang 89 at the other end of said srping extends into and is retained within aperture 91 in the end of cap 83.

Normally, cam handle 81 is in the near horizontal position as shown in FIG. 1. When cam handle 81 is lifted and moved pivotally in a clockwise direction toward a vertical position, cam shaft 76 rotates against the action of spring 86. When cam handle 81 is released, spring 86 causes the counterclockwise return rotation of cam shaft 76.

Supports 68 and 69 have integrally formed, forwardly extending arms 101 and 102, respectively, each having laterally extending apertures 103 and 104, respectively, axially aligned with each other. Apertures 103 and 104 accommodate between them pivot pin 106 near each end of which there is formed an annular recess 107 which accommodates a corresponding split ring 108, said split rings lying against the respective outer vertical surfaces of arms 101 and 102 for securing said pin in position.

Pivotally mounted on pin 106 is an elongated pressure lever arm 109 located between supports 68, 69 and arms 101, 102. The bottom rear portion of lever arm 109 is recessed to form a rearwardly extending tail 111 which normally rests upon cam surface 78 of cam shaft 76 and cooperates therewith.

Integrally formed on the forward portion of lever arm 109 is a pair of forwardly extending spaced fingers 112 and 113, each having a respective circular aperture 114 and 116 axially aligned with each other and accommodating a pivot pin 117. Located in the slot formed between fingers 112 and 113 is a rocking pressure bar or plate 118 having a circular aperture 119 through which pin 117 freely extends and around which bar 118 is pivotable. The longitudinal bottom surface 121 of bar 118 has a convex transverse profile to form an arc having a 5 inch radius.

In order to prevent undue vibration or jiggling of pivotable pressure bar 118 and to stabilize its action, a spring plate 120 is secured to the top surface of lever arm 109 by means of a screw 120a. The forward portion of spring plate 120 extends over the recess formed between fingers 112 and 113 and bears resiliently upon the top surface of pressure bar 118, said spring plate 120 yieldably damping the pivoting motion of said pressure bar without interfering with its function.

The space between fingers 112 and 113 is sufficiently elongated to provide space for the integrally formed, rearwardly extending foot 122 of pressure bar 118 whereby the latter is not only enabled to move pivotally relative to lever arm 109 but also to permit elongation of the bottom surface 121 for enhancing the effect of its function, as will be described hereinafter.

Mounted by means of screws 123 to the outer vertical surfaces of fingers 112 and 113 are respective pressure posts 124 and 126, each of said posts having inwardly extending, integrally formed ledges 127 and 128 which bear against the bottom horizontal surfaces of fingers 112 and 113, respectively, whereby said posts are secured firmly in position. See also FIG. 9. The bottom of each pressure post 124 and 126 has a vertically extending recess 129, each of which accommodates a downwardly extending firm but resilient pressure pad 132 and 133, respectively.

Secured on the top surface of platform 29 by means of screws 134 extending through threaded apertures 135 is a pair of spaced guides 136 and 137 extending longitudinally of the apparatus. See FIGS. 1, 9, 10 and 12. Formed along the inner vertical surfaces of guides 136, 137 are longitudinally extending horizontal slots 138 and 139, respectively. A movable transverse flat gauge plate 140 has a pair of spaced, integrally formed, rearwardly extending legs 141 and 142, the outer edge portions of which are slidably accommodated within slots 138, 139 respectively.

Located on top of guides 136 and 137 are clamps 143 and 144, respectively, the inner portions thereof having integrally formed, downwardly extending legs 146 and 147 which bear on the top surfaces of legs 141 and 142, respectively. Thumb screws 148 and 149 extend through accommodating apertures in clamps 143 and 144 and engage respective threaded recesses 150 in guides 136 and 137. Thus, legs 141 and 142 may be longitudinally adjusted by the operator of the apparatus to secure gauge plate 140 in the desired position.

Integrally formed on the forward outer portions of gauge plate 140 is a pair of outwardly extending spaced ears 151 and 152, the forward edges of which are longitudinally aligned with each other and together form a backstop whose function will be described hereinafter. In the forward edge of gauge plate 140 there is a centrally located rectangular indexing recess 153.

Superimposed upon gauge plate 140 is a transversely extending positioner plate 154 secured thereto by means of spaced screws 156 extending through and engaging suitable aligned apertures in said plate. Formed in the central forward portion of positioner plate 154 is a laterally extending elongated recess 157 while the forward spaced edge portions of positioner plate 154 have integrally formed, downwardly extending backstop flanges 158 and 159 that extend over the forward edges of gauge plate 140 on both sides of indexing recess 153. The respective inner vertical edges of flanges 158 and 159 are spaced apart substantially to the same extent as the two side walls of indexing recess 153.

Figure 10:
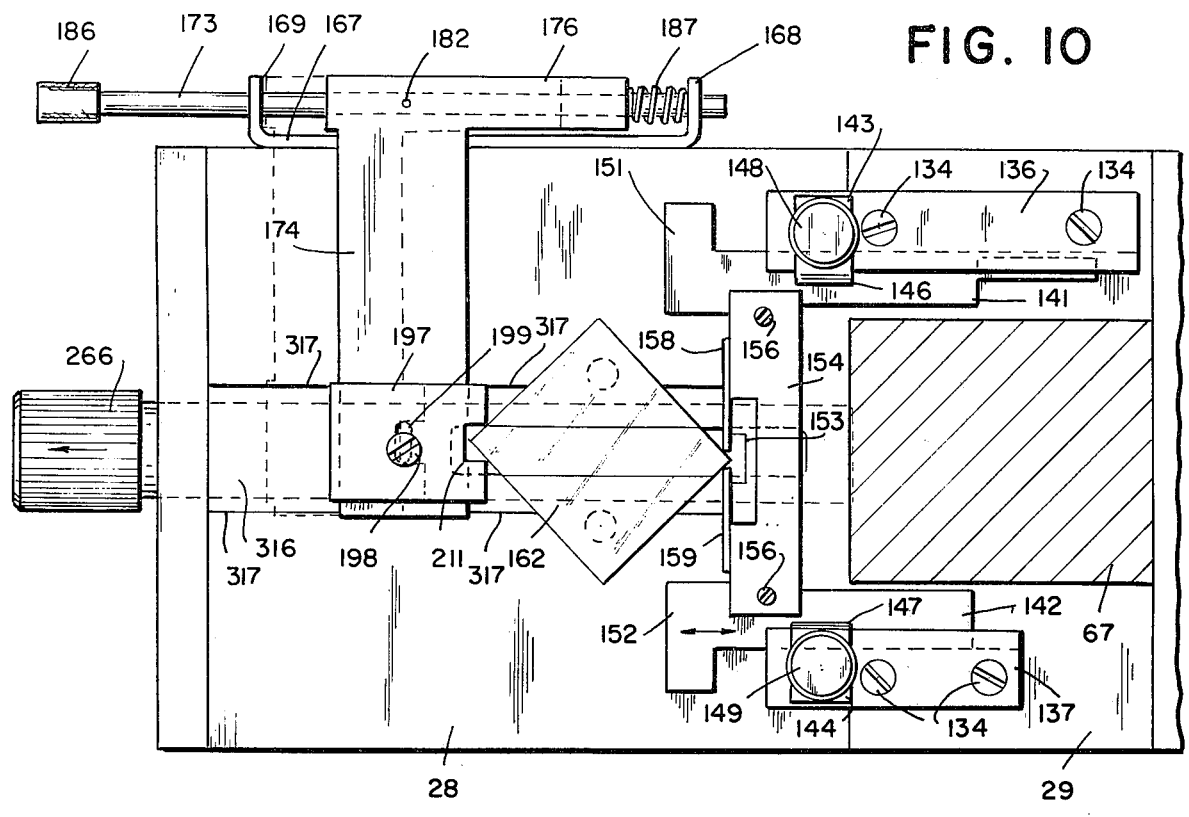
FIG. 10 is a top fragmentary view of the apparatus shown in FIG. 1, some parts being omitted.
Figure 12:
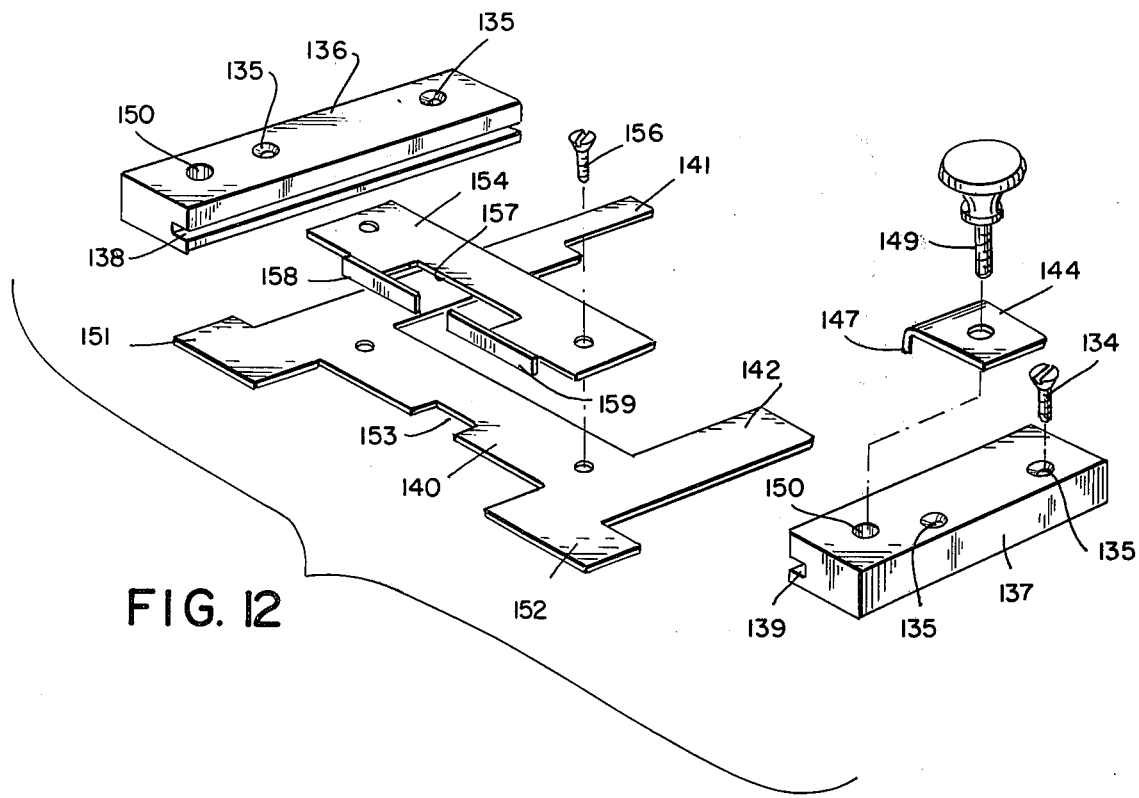
FIG. 12 is an exploded perspective view of the guide mechanism shown in FIG. 1, 9 and 10.

The forward edges of ears 151 and 152 serve as a backstop against which an elongated edge of glass block 161 bears, as illustrated in FIG. 1, for stabilizing the position thereof for the scoring and breaking action to be described hereinafter. Recess 153 and the space between the inner ends of flanges 158 and 159 serve as a locating station for an apex or corner of a glass block 162, as illustrated in FIG. 10 when a diagonal break is to be performed.

Flanges 158 and 159 can also serve as a backstop for an elongated edge of a glass block whose dimensions would be smaller than the distance between the inner opposing edges of ears 151 and 152.

Mounted on the left vertical edge of platform 28 by means of screws 166 is a flat bracket 167, the forward and rear ends of which have a pair of spaced, integrally formed, outwardly extending ears 168, 169. See FIGS. 1, 9, 10 and 11. Ears 168 and 169 have respective axially aligned apertures 171, 172 which together slidably accommodate a positioner shaft 173 for longitudinal and reciprocal movement in respect thereof. Cooperating with shaft 173 is a glass positioning bar 174, the outer end of which has an integrally formed, rearwardly extending arm 176, said bar and arm having respective spaced, integrally formed, downwardly extending legs 177 and 178, each provided with respective axially aligned apertures 179 and 181 which also accommodate the shank of shaft 73. Positioning bar 174 is connected to shaft 173 by means of pin 182 extending through an aperture 183 in bar 174 and into aperture 184 in shaft 173 whereby manual rotation of knob 186 on shaft 173 produces the pivoting motion of positioning bar 174. Located between ear 168 and leg 177 is a combination compression and torsion spring 187 that encircles shaft 173. Spring 187 has a rearwardly extending tang 188 held fast in accommodating aperture 189 in ear 168. A tang 191 on the forward end of spring 187 is held fast in an accommodating aperture 192 in leg 177. Under the action of spring 187, positioning bar 174 is normally located in a downwardly extending location along side wall 13, as illustrated in FIG. 9. Upon clockwise rotating of knob 186 and of shaft 173, positioning bar 174 is pivotally moved into a horizontal position as shown in dotted outline in FIG. 9. Under the action of compression spring 187, leg 178 is normally urged into abutment against the inner surface of ear 169. When knob 186 and shaft 173 are rotated clockwise, and bar 174 is moved into a horizontal position as shown in FIGS. 9 and 10, it is possible for the operator to urge shaft 173 rearwardly against the action of spring 187 to cause bar 174 to move rearwardly toward gauge plate 140. When the operator manually releases knob 186, spring 187 urges positioning bar 174 forward until leg 178 abuts ear 169 while, at the same time, said spring causes the counterclockwise pivoting motion of bar 174 to retract the latter from stage 28 and to be urged into its non-operating position as shown in FIG. 9.

The right free end of positioning bar 174 has a downwardly extending flange 196, the bottom edge of which rests upon the top surface of platform 28 whereby bar 174 is maintained in a horizontal spaced position relative to platform 28. Mounted upon positioning bar 174 is a clamp plate 197 which extends substantially perpendicularly of bar 174 and is secured thereto by means of a screw 198 extending freely through elongated slot 199 in plate 197 and threadably engaging a suitably threaded aperture (not shown) in bar 174. By virtue of slot 199 being somewhat elongated, clamp plate 197 may be adjusted relative to positioning bar 174 to the desired location and secured therein by the head of screw 198. The rear portion of clamp plate 197 has a notch 201 which acts as an indexing locater for one apex corner of glass block 162, the other diagonal apex corner thereof being engaged between the inner opposing ends of flanges 158. See FIGS. 10 and 12. Glass block 162 is located in the proper scoring position as shown in FIG. 10 by the operator manually applying a pushing motion to knob 186 of shaft 173 until said block is secured by pressure pads 133, as will be described hereinafter in explaining the operation of the apparatus.

Before the glass block is broken, it is scored by a glass cutting wheel which moves into a cutting position through an elongated slot 211 extending longitudinally through platform 28 on which the glass block rests. The glass cutting wheel assembly is mounted in a block 212 supported between walls 22 and 23. See FIGS. 2, 3 and 10. Formed in block 212 is a longitudinally extending cylindrical recess 213 which accommodates a reciprocably movable cylindrical sleeve 214 (FIGS. 2 and 9). The rear portion of sleeve 214 has a longitudinally extending tubular projection 216 of a smaller diameter to which is secured by press fit a forwardly extending annular flange 217 of a cylindrical bearing housing 218 in the interior of which is located a pair of spaced circular bearings 219 (FIG. 2).

Mounted upon the rear end of bearing housing 218 is a roller end cap housing 221 secured thereto by a pair of spaced screws 222 extending through apertures 223 in said end cap housing and engaging suitable threaded recesses, not shown, in the rear end of bearing housing 218. See FIGS. 6 and 7. The bottom of end cap housing 221 has a vertical recess 224 which accommodates a roller holder 226 having a pair of downwardly extending spaced flanges 227 between which is mounted a horizontal pin 228 rotatably supporting roller 229.

The bottom of roller 229 extends slightly externally of the rounded circumference of end cap 221 and of bearing housing 218 and sleeve 214, whereby the bottom portion of those elements is maintained slightly spaced apart from the surface of recess 213 against the effect of gravity. The precise extent to which the peripheral surface of roller 229 protrudes below the circumferential dimension of end cap 221 is adjustably determined by set screw 231 threadably engaged within a top recess 232 of end cap 221 whereby the top surface of holder 226 bears against the bottom surface of said screw.

Located in the rear portion of bearing housing 218 is a vertical, rectangular aperture 233 which slidably accommodates a rectangular lifting block 234 movable vertically in said aperture. The upper portion of lifting block 234 has a vertical circular recess 236 which slidably accommodates an elongated post 237, the bottom of which has an integrally formed downwardly extending pair of spaced tines 238, said tines being dimensioned to provide a yieldable friction fit with the walls of recess 236. See FIG. 8.

Integrally formed on the top of post 237 is a cutter wheel block 239 having a wider diameter than said post and having an annular shoulder 240 at the bottom thereof which rests upon the top of lifting block 234 and having a pair of upwardly extending spaced arms 241. Mounted between arms 241 is a pin 242 on which is rotatably mounted a means for scoring glass which is a glass cutting wheel 243 made of suitable material such as tungsten carbide, or the like, and having a sharp peripheral edge for cutting or scoring the surface of the glass block.

Formed in the rear portion of cutter wheel block 239 is a horizontal notch 244 which is engageable by a suitable tool for removing said block from the apparatus so that the glass cutting wheel may be replaced.

The forward portion of lifting block 234 has a horizontal recess 246 which slidably accommodates stub 247 integrally formed on the rear end of rod 248 rotatably supported between spaced bearings 219. Stub 247 is located off-center from the longitudinal axis of rod 248 whereby rotation of the latter in one direction produces the eccentric motion of stub 247 which slides in recess 246 to bring about the upward motion of lifting block 234 and, concomitantly, of cutting wheel 243. The rotation of rod 248 in the opposite direction brings about the lowering of block 234 and of cutting wheel 243.

Rod 248 is mounted fast by means of a press fit upon the rear end of an elongated torsion bar 249 which extends forwardly through the longitudinal cavity 250 of sleeve 214. Mounted fast by means of a press fit on the forward end of torsion bar 249 is a control rod 251 which extends through aperture 252 in sleeve 214. Intermediate the ends of rod 251 there is formed an annular recess 253 that forms a keyway into which the inner end of a set screw 254 extends freely. Set screw 254 permits rotational movement of rod 251 while preventing longitudinal movement of the torsion bar assembly relative to sleeve 214 during operation of the apparatus. The torsion bar assembly can be removed longitudinally from sleeve 214 by retraction of screw 254. Also, set screw 254 provides for the unitary longitudinal movement of sleeve 214 and the torsion bar and cutting wheel assemblies.

Integrally formed on the forward end of sleeve 214 is a threaded annular stub 256 through which control rod 251 extends. Encircling stub 256 is an annular yoke 257, the rear surface of which abuts against annular shoulder 258 of sleeve 214. Yoke 257 has a downwardly extending, integrally formed leg 259 having an aperture 260 through which the threaded shank of screw 261 extends. Yoke 257 is secured against shoulder 258 of sleeve 214 by means of a jam nut 262 threadably engaging stub 256, with the rear surface of said yoke normally abutting the outer surface of wall 24 to limit the rearward movement of sleeve 214 and of the cutting wheel assembly relative to the apparatus. Near the forward end of rod 251 there is formed a lateral flat 263 which is engaged by the inner end of a radially extending set screw 264 in a control knob 266 releasably secured to said rod by way of an accommodating central aperture 267 for producing longitudinal and rotational motion of torsion bar 249.

The rear portion of knob 266 has an integrally formed, rearwardly extending annular flange 271 of reduced outer diameter which accommodates an annular stop ring 272 secured to said flange by means of a plurality of spaced set screws 273. Secured fast in ring 272 is a rearwardly extending stop element 274 which, when knob 266 is rotated, abuts against forwardly extending stop pin 276 mounted in the front surface of leg 259 to limit the rotation of said knob and the elements connected thereto. The extend of rotation of knob 266 may be adjusted by relocating the position of stop ring 272 relative to flange 271 by means of resetting set screws 273.

The rear portion of knob 266 has a central recess 277 which freely accommodates a coiled return spring 278, the forwardly extending tang 279 on one end thereof being mounted fast in the rear wall of recess 277. The rearwardly extending tang 281 on the other end of said spring is mounted fast in a semi-circular boss 282 integrally formed on the forward end of stub 256. The clockwise rotation of knob 266 against the action of spring 278 produces the clockwise rotation of rod 251, torsion bar 249, and of rod 248 whereby stub 247 moves slidably in recess 246 to cause the upward movement of lifting block 234 and of cutting wheel 243. When knob 266 is released, return spring 278 operates to rotate said knob, rods 248, 251 and torsion bar 249 counterclockwise to cause the return of stub 247 to its original position and to lower lifting block 234 as well as cutting wheel 243. When knob 266 is rotated clockwise to cause stub 247 to move in an arcuate path to raise lifting block 234, torsion bar 249 provides sufficient resilience to produce yieldable upward pressure upon cutting wheel 243 whereby excess pressure of said wheel is avoided when the latter is caused to bear upon and move along the bottom surface of glass block 161 to produce the requisite scoring line thereon for subsequent breaking of the block.

When knob 266 is rotated to raise cutting wheel 243 and then pulled forward from the apparatus to cause said wheel to produce a scoring line on the bottom surface of glass block 161, the same action by way of yoke 257 and leg 259 causes the forward movement of control rod 286, the forward end of which is connected to the threaded shank of screw 261 extending through leg 259. Rod 286 is accommodated for free longitudinal movement in a suitable horizontal recess spaced below recess 213 in block 212. Projecting downwardly from the rear end portion of control rod 286 is a control pin 287 which determines the length of the permissible retraction of knob 266 and the entire torsion bar - cutting wheel assembly, as determined by the selected location of one of a plurality of cam surfaces on an elongated rotatable selector shaft 288 located within an accommodating horizontal recess 289 in block 212.

Integrally formed on the forward end of selector shaft 288 and extending externally of wall 24 is a knob 291 having an annular sloping bevel 292 on which are marked spaced indexing numbers such as 1, 2 and 3. Between shaft 288 and knob 291 there is formed an annular recess 293 which is slidably engaged by a correspondingly shaped arcuate rim 294 in a selector retainer plate 296 secured to the front surface of wall 24 by means of screws 297. Rim 294 stabilizes the rotation of rod 288 while preventing longitudinal movement thereof. The removal of plate 296 permits the removal or replacement of rod 288.

Located near the forward portion of block 212 is a vertical aperture 298, the bottom of which threadably accommodates a screw 299, the elongated shank 301 of which extends upwardly through aperture 298 and supports the lower end of a captive spring 302, the upper end of which bears yieldably against detent ball 303. Ball 303 cooperates with any one of a plurality of circumferentially spaced indexing recesses 306, 307 and 308, formed in the surface of selector shaft 288. By this means, shaft 288 may be rotated by manual operation of knob 291 to position said shaft in any selected one of several indexed locations.

Formed on the surface of selector shaft 288 are circumferentially spaced elongated cam flats 311, 312 and 313, of predetermined varying lengths as shown in FIGS. 4A, 4B and 4C. When indexing recess 306 is engaged by detent ball 303, selector shaft 288 is in a position where flat 311 is located directly above the axis of said shaft as shown in FIG. 4A, the pin 287 of control bar 286 being arranged to move along said flat from the rear end to the forward end thereof to limit the longitudinal movement of the cutting wheel assembly.

When knob 292 is rotated to cause detent ball 303 to engage recess 307, flat 312 is presented in the upper position to be engaged by pin 287. Flat 312 is somewhat shorter than flat 311 whereby the stroke of the cutting wheel assembly, including torsion bar 249 and knob 266, is limited to a shorter distance.

When knob 292 is rotated to cause detent ball 303 to engage recess 308, a still shorter flat 313 is located opposite pin 287 for further delimiting to a shorter longitudinal stroke the operation of the cutting wheel assembly. Thus, depending upon the requisite length of the score mark to be impressed upon the bottom surface of the glass block, the apparatus can be adjusted accordingly.

Centrally located in the top surface 28 is a longitudinal recessed channel 316 (FIGS. 1, 9 and 10) over which glass blocks 161 and 162 are placed for the cutting and breaking actions performed by the apparatus herein. Channel 316 is bounded by longitudinal parallel edges 317 and, in one embodiment, its depth is approximately 1000th of an inch. The upper corners of edges 317 serve as linear fulcrums about which parallel linear portions of the glass block pivot when pressure bar 118 is caused to bear linearly down upon said block in a location intermediate said edges to cause the block to break after it has been scored by cutting wheel 243.

OPERATION OF THE FIRST EMBODIMENT

Glass blocks that are intended to be converted into microtome knives and the like, are generally provided in raw stock in precut 2 inch square sizes, and having a thickness range of approximately ⅛th to ½ inch inclusive. The procedure for producing the glass microtome knives comprises the following steps:

Clamp arm 67 is first raised by turning hand wheel 46 counterclockwise whereby lever arm 109 and pressure bar 118 are also raised to provide room for accepting a block of glass of the requisite thickness. See FIGS. 1, 2, 9, 12 and 13. The 2 inch square block 161 is positioned on the top surface of platform 28 with the rear edge of said block abutting the forward edges of backstop ears 151 and 152. Gauge plate 140 has previously been adjusted by manipulation of thumb screws 148 and 149 in order to locate ears 151 and 152 in the required position. Block 161 is arranged symmetrically to straddle channel 316. Backstop ears 151 and 152 may have suitable indicator marks thereon to assist visually in centering block 161 over channel 316.

Thereafter, clamp arm 67 is lowered by turning hand wheel 46 clockwise which brings about the lowering of lever arm 109 and pressure bar 118 until pads 132 and 133 of pressure posts 124 and 126 rest upon the top surface of glass block 161. Hand wheel 46 is continued to be turned until the limits of resistance of resilient pressure pads 132 and 133 is reached, which will be manifested by wheel 46 overriding shaft 38 by way of slip clutch ring 54. By this means, glass block 161 is now secured firmly in position with only the requisite amount of clamping force to ensure that no untoward motion on the part of said block takes place while it is being scored by the cutting wheels This self-limiting securing force also prevents premature or accidental breaking of the glass block. The friction characteristics of clutch ring 54 and the pressure characteristics of spring 51 are selected to provide the requisite operational functions for this purpose.

Now that glass block 161 is secured in position for scoring, knob 266 is grasped to retract sleeve 215 until index mark 318 on said sleeve is just visible. This action causes the cutting wheel assembly to move forward in slot 211, rolling on wheel 229, and bringing pin 287 into registry with annular recess 319 on selector shaft 288. Thereafter, knob 292 is rotated into a position where graduation mark No. 1 is located in the top vertical position with selector shaft 288 in the position shown in FIG. 4A. Selector shaft 288 is retained in that position by the action of ball 303 cooperating with detent recess 306 so that flat 311 is arrayed on top of said selector shaft. Knob 266 is then retracted further while pin 287 moves forward in flat 311 until it abuts the forward wall of the recess formed by said flat. Next, knob 266 is rotated gently clockwise against the action of spring 278 to apply torsion force upon bar 249 whereby off-center stub 247 moves in an arcuate path within recess 246 to cause lifting block 234 to move upwardly to bring cutting wheel 243 into contact with the bottom surface of glass block 161. By virtue of the action of torsion bar 249, the edge of cutting wheel 243 is brought into contact with glass block 161 with just the correct amount of pressure that is requisite for scoring the glass. Thereafter, in one continuous stroke, knob 266 is pushed inwardly until pin 287 abuts the rear edge of the rear wall of the recess formed by flat 311 thereby limiting the scoring motion of wheel 243 to approximately ½ inches. Cutting wheel 243 is made of a suitable hard material such as tungsten carbide, or the like, which will produce the requisiste scoring mark on the bottom surface of the glass block. After the score mark has been made on the bottom of the glass block, knob 266 is released whereupon it is rotationally returned counterclockwise by the action of spring 278 to cause stub 247 to move in an arcuate counterclockwise path within recess 246 whereby lifting block 234 is lowered and assumes its original position and cutting wheel 243 is retracted from the glass block.

After glass block 161 has been scored by cutting wheel 243, lever 81 is grasped manually and is slowly and firmly moved upwardly whereby the rotation of cam 78 acting on the bottom of tail piece 111 of lever arm 109 produces pivotal motion of the latter and causes the downward motion of pressure bar 118 upon the top surface of block 161. The apex of the curved bottom surface 121 is aligned vertically with the annular apex of cutting wheel 243 whereby said bar exerts pressure downwardly on the glass block directly above the score mark formed by said cutting wheel on the bottom of said glass block. Furthermore, the linear dimension of surface 121 of bar 118 is substantially parallel to and is arrayed intermediate the linear edges 317 of channel 316. With continued lifting of lever 81, the operator will observe that a free-breaking crack begins at the bottom surface of the glass at the score mark. At this point, the lever 81 is released, but it will still maintain the pre-applied force of bar 118 while the free break will propagate from the rear to the front of the glass block along a straight line normal to the backstop and aligned with the score mark. The forces that are applied to the glass block for breaking the latter constitute the spaced apart elongated support lines bounding recessed channel 316 and the intermediately spaced elongated and substantially parallel apex of the bottom surface 121 of pressure bar 118. The apparatus herein provides for elongated base pressure lines in the form of edges 317 and pressure surface 121 all directionally oriented in parallel array to ensure clean straight-line breaking of the glass block which has not been as readily achieved by prior art devices where the breaking forces have been applied in discrete spaced pressure points.

After the break of the glass block has occurred, hand wheel 46 is then turned counterclockwise to raise sliding clamp arm 67 and pressure bar 118 to release the two pieces of the broken glass. During this operation, cam handle 81 is automatically returned to its original position by the action of spring 86.

The 2 × 2 inches glass block has now been broken into two 1 × 2 inch strips. Again, each of the 1 × 2 inch strips is mounted on the top surface of platform 28 and the procedure described hereinbefore is followed to break the strip into 1 × 1 inch squares which are now ready for final diagonal breaking into microtome knives.

Figure 11:
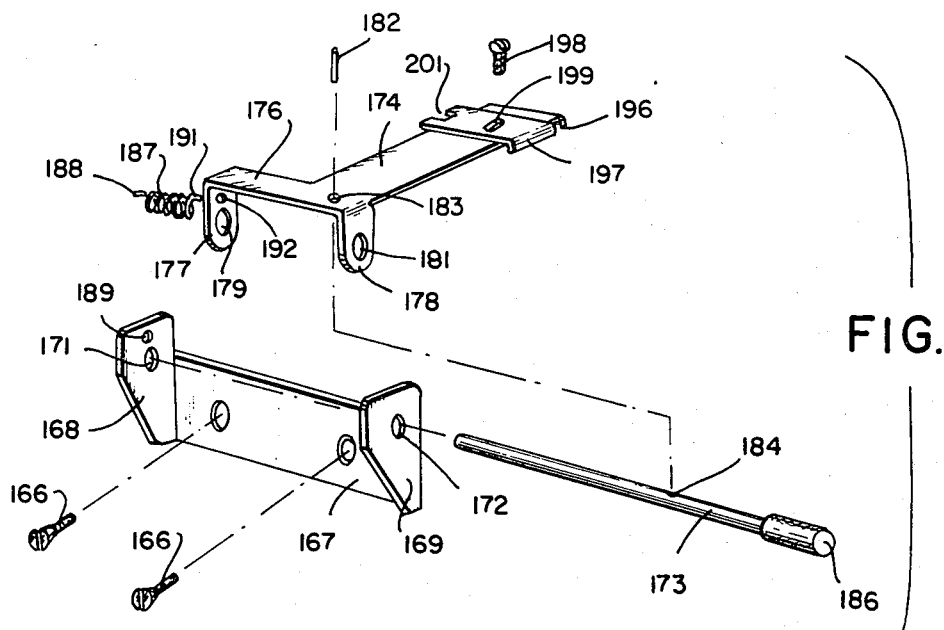
FIG. 11 is an exploded perspective view of the component elements of one embodiment of the glass block holder or retainer shown in FIGS. 9 and 10.

In order to produce a cutting kife for a microtome, it is necessary to break each of the one inch square blocks diagonally to produce two separate, generally triangular blocks having a sharp knife edge at one apex. The diagonal break is produced by taking a one inch square glass block 162 (FIG. 10) and placing one corner thereof into the space formed between the inner opposing ends of flanges 158, 159. Recess 153 in gauge plate 140 is sufficiently wide and deep so that flanges 158, 159 keep the corner of glass block 162 spaced apart from gauge plate 140. The inner opposing end portions of flanges 158, 159 are resilient so that when glass block 162 is broken into a pair of knives, the knife edges thereof are protected from damage because of the yieldability of said flanges when the break occurs. Knob 186 is rotated clockwise to cause positioning bar 174 to assume a horizontal position slightly above the top surface of platform 28 (FIGS. 9 and 11). Thereafter, knob 186 is pushed inwardly against the action of spring 187 to bring notch 201 of clamp plate 197 into engagement with an adjacent corner of glass block 162. The location of clamp plate 197 on positioning bar 174 is adjusted in order to place glass block 162 in the proper diagonal orientation for receiving the score mark produced by cutting wheel 243. Thereafter, the hand wheel 46 is turned clockwise to bring pressure pads 133 down upon the glass block 162 to secure it firmly in position on platform 28, after which knob 186 is released to permit spring 187 to both move positioning bar 174 forwardly and pivotally counterclockwise back to its original vertical position along the left side of the apparatus as shown in FIG. 9.

The steps for scoring and breaking glass block 162 diagonally are the same as described hereinbefore, except for rotating knob 291 and positioning selector shaft 288 into position No. 2 as represented in FIG. 4B. In order to produce the diagonal cut, flat 312 on selector shaft 288 is selected to that pin 287 may move a longer distance to produce the longer score mark on the bottom of glass block 162. In some cases, where necessary, an even longer cut may be produced by cutting wheel 243 when selector shaft 288 is rotated into its third position as shown in FIG. 4C when that may be necessary.

As in the case of breaking and producing the preliminary square blocks, the production of the diagonal cut on the square block 162 is produced by the respective linear forces generated on the one hand by edges 317 bounding recessed channel 316, and on the other hand by the intermediately spaced linear bottom surface 121 of pressure bar 118 to ensure an even straight-line cut which results in the desired knife edge at a corner of the resulting triangular glass block.

DESCRIPTION OF ALTERNATIVE EMBODIMENTS

In another embodiment of the present invention, as shown in FIGS. 15-18, where the operation of the apparatus may be confined only to two selected lengths of glass scoring by the cutting wheel, knob 291 and selector shaft 288, as well as control rod 286 and control pin 287 from the previous embodiment, are eliminated.

The alternative embodiment includes a vertical plunger 326 slidably mounted in a vertical aperture 327 in block 212. Plunger 326 has a downwardly extending stub 328 of somewhat smaller cross-section which is encircled by a coil spring 329, the upper end of which bears against the shoulder formed between plunger 326 and stub 328. The bottom end of spring 329 is held captive by the inner end of a threaded plug 331 at the bottom of aperture 327. Spring 329 acts normally to urge plunger 326 upwardly. Integrally formed at the upper end of plunger 326 is an upwardly extending nib 332.

Located intermediate the upper and lower ends of plunger 326 is a circular aperture 333 extending therethrough. In the area of aperture 333, plunger 326 has a laterally extending concave recess 334, the lower portion of which serves as a cam surface. Block 212 has a longitudinally extending horizontal recess 336 which intersects and passes perpendicularly through aperture 327. Rectilinearly accommodated in recess 336 is a plunger adjustment shaft 337, the outer end of which terminates in knurled knob 338. Formed on the inner end of adjustment shaft 337 is an annular beveled cam 339 at the central end of which is integrally formed an inwardly extending pin 341 of considerably smaller diameter than shaft 337. Integrally formed on the free end of pin 341 is a circular stop element 342. When knob 338 is pushed to cause the inward movement of adjustment shaft 337, cam 339 bears against the curved cam recess 334 to produce the downward motion of plunger shaft 326 against the action of spring 329 as shown in FIG. 15. In this position of plunger shaft 326, nib 332 is held retracted from the bottom of recess 213. In the embodiment shown in FIGS. 15 and 16, the previous longitudinal slot 211 of the previous embodiment is replaced by a somewhat shorter slot 343 within which the cutting wheel assembly moves rectilinearly with the forward and rear end walls of said slot serving as abutments to limit the longitudinal movement of said cutting wheel and of the cutting wheel assembly connected to sleeve 214. In the illustration of FIG. 15, the apparatus is shown in a condition where the cutting wheel is enabled to produce the long stroke score for preparing the glass block for a diagonal break, as described in conjunction with FIG. 10. When it is desired to arrange the apparatus for a short score by cutting wheel 243, then knob 338 and plunger adjustment shaft 337 are retracted, releasing plunger 326 to permit spring 329 to urge said plunger upwardly so that nib 332 cooperates with annular recess 344 formed in sleeve 214 in this embodiment. Before knob 338 is retracted for this purpose, control knob 266 along with the cutting wheel assembly on sleeve 214 is retracted to bring annular recess 344 into alignment with aperture 327, thus permitting nib 332 to control the longitudinal movement of sleeve 214 as limited by spaced shoulders 346 and 347 bounding annular recess 344. Thus, the stroke of cutting wheel 243 is limited by the space between shoulders 346 and 347, and the thickness of nib 332. As in the previous embodiment, knob 266 operated similarly to produce the same torsion action on bar 249 to raise and lower the cutting wheel assembly and to produce the scoring stroke of cutting wheel 243 upon the bottom surface of the glass block, as described hereinbefore.

The outward movement of knob 338 and adjustment shaft 337 is limited by the inner surface of stop element 342 abutting the side wall of plunger shaft 326.

In the embodiment of the apparatus shown in FIGS. 19-23, the previous mechanism for positioning the glass block for the diagonal cut shown in FIGS. 9, 10 and 11, comprising positioning bar 174 and its associated mechanisms, is dispensed with, and in substitution therefor there is provided in platform 28 a longitudinal slot having a forwardly and downwardly slanting floor 351, spaced side walls 352 and 353 and outwardly extending slanted channels 354 and 356 coinciding with floor 351. The slanting slot slidably accommodates a triangular-shaped positioner 357 having a bottom slanting surface 358 which cooperates slidably with slot floor 351. The bottom portion of positioner 357 has outwardly extending, integrally formed, slanted flange rails 359 and 361 which slidably cooperate with channels 354 and 356, respectively. The forward end of glass positioner 357 has a recessed notch 362 which serves to engage a corner of glass block 162 when said positioner is moved forward by pressure applied by the operator's thumb against the knurl 363 formed in a portion of the top surface of the positioner. After pressure pads 132 and 133 have been brought to bear down upon glass block 162 to secure the latter in position, glass positioner 357 may then be retracted into its original position, after which the glass block is scored and broken in the manner described hereinbefore.

Although the present invention has been described with reference to particular embodiments and examples, it will be apparent to those skilled in the art that variations and modifications can be substituted therefor without departing from the principles and true spirit of the invention. The Abstract given above is for the convenience of technical searchers and is not to be used for interpreting the scope of the invention or claims.

I claim:

1. Apparatus for cutting a glass block which comprises: a frame; a platform on said frame; spaced elongated parallel support means on said platform for supporting the glass block, said support means defining a recess therebetween; an elongated pressure bar disposed above and intermediate said support means, parallel to said recess, said pressure bar being movably mounted with respect to said support means to apply a linearly arrayed force to the top surface of the glass block, said support means being spaced apart by a distance greater than the width of said pressure bar; and means in said frame producing a score mark on the bottom of said glass block intermediate said support means and directly beneath said pressure bar.

2. Apparatus according to claim 1 and further comprising a pivotable lever element movable vertically relative to said frame, said bar being pivotally mounted on said lever element and a cam on said frame for moving said lever to cause said pressure bar to bear downwardly upon said glass block.

3. Apparatus according to claim 2 and further comprising spring means mounted upon said lever element and operative upon said pressure bar to prevent vibration of the latter.

4. Apparatus according to claim 2 and further comprising a clamp arm in said frame and movable reciprocably and perpendicularly relative to said platform, a hand wheel rotatably mounted on said frame, a gear linkage between said hand wheel and said clamp arm for producing reciprocal motion of said clamp arm, and a slip clutch between said wheel and said linkage to permit override of said wheel when a predetermined resistance is encountered by the downward movement of said clamp arm.

5. Apparatus according to claim 1 wherein said means for producing a score mark comprises a cutting wheel normally retracted from the bottom surface of said glass block which cutting wheel is connected to a torsion bar connected to said cutting wheel, the rotation of said torsion bar causing said cutting wheel to bear yieldably against the bottom surface of said glass block and the longitudinal movement of said torsion bar causing said cutting wheel to produce a longitudinal score mark on said glass block.

6. Apparatus according to claim 5 and further comprising a spring connected to said torsion bar against which the latter is rotated, said spring causing the return rotation of said torsion bar when the latter is released in order to retract said cutting wheel from said glass block.

7. Apparatus according to claim 5 and further comprising selectable limit means cooperating with said torsion bar for limiting the longitudinal motion thereof and of said cutting wheel to determine the length of the score mark upon said glass block.

8. Apparatus according to claim 1 and further comprising a longitudinal slot in said platform parallel with and intermediate with said support means, a support element movable longitudinally within said slot, said means for producing a score mark on said support element, a reciprocally and longitudinally movable torsion bar in said frame, said means for producing a score mark being mounted on the inner end of said torsion bar, said means for producing a score mark being retracted from the bottom surface of said glass block, the retraction of said torsion bar when under tension causing said means to produce a score mark to score the bottom surface of said glass block.

9. Apparatus according to claim 8 and further comprising means for selectively limiting the longitudinal motion of said torsion bar and of said cutting wheel to control the length of the score mark produced by said wheel on the glass block.

10. Apparatus according to claim 1 and further comprising a second recessed channel longitudingally aligned with the first mentioned channel, the bottom surface of said second channel being sloped at a declining angle from the top surface of said platform, a slide element reciprocably movable within said second channel, said slide element being generally triangularly contoured whereby in the retracted position the top of said element is substantially at a level with the top surface of said platform and when said slide element is pushed forward the top surface thereof is raised above the top surface of said platform, a notch in the forward end of said slide element, said notch releasably engaging a corner of said glass block when the latter is arrayed for a diagonal score and break.

11. Apparatus according to claim 1 and further comprising a backstop mounted on said platform against which the glass block abuts, a notch in said backstop which engages a corner of the glass block when the latter is positioned for a diagonal cut and break, and positioning means movable above the surface of said platform and a notch on said positioning bar to engage the opposite corner of said glass block for locating the latter in the proper cutting position, said positioning bar and notch being retractable after the glass block has been secured in position.

12. Apparatus according to claim 11 and further comprising sloped recesses in the opposing side walls of said second channel and sloped, outwardly extending flanges on said slide element cooperating with said sloped recesses to guide the motion of said slide element.

13. Apparatus according to claim 12 and further comprising a knurled surface on top of said slide element for facilitating the manual projection and retraction thereof.

14. Apparatus according to claim 1 and further comprising means on said frame for releasably securing said glass block into position above said channel prior to the application of said pressure bar against said glass block.

15. Apparatus according to claim 1 and further comprising an adjustable backstop on said platform against which said glass block abuts when in position for scoring and breaking.

16. Apparatus according to claim 1 and further comprising a torsion bar means connected to an end of said means for producing a score mark, said means for producing a score mark movable longitudinally in said channel and being normally retracted from the bottom surface of said glass block and being urged into contact with said block when the outer end of said torsion bar means is rotated.

17. Apparatus according to claim 1 in which said channel is one-thousandth of an inch in depth.

18. Apparatus according to claim 1 in which said means for producing a score mark on the bottom surface of the glass block is a cutting wheel.

* * * * *